United States Patent [19]

Bosso et al.

[11] 3,959,106

[45] May 25, 1976

[54] METHOD OF ELECTRODEPOSITING QUATERNARY SULFONIUM GROUP-CONTAINING RESINS

[75] Inventors: Joseph F. Bosso, Lower Burrell; Marco Wismer, Gibsonia, both of Pa.

[73] Assignee: PPG Industries, Inc., Pittsburgh, Pa.

[22] Filed: Jan. 8, 1975

[21] Appl. No.: 539,568

Related U.S. Application Data

[60] Division of Ser. No. 455,428, March 27, 1974, abandoned, which is a continuation-in-part of Ser. No. 292,360, Sept. 26, 1972, abandoned, and a continuation-in-part of Ser. No. 210,141, Dec. 20, 1971, abandoned.

[52] U.S. Cl. ............................................... 204/181
[51] Int. Cl.$^2$ .......................................... C25D 13/06
[58] Field of Search ..................................... 204/181

[56] References Cited
UNITED STATES PATENTS

| | | | |
|---|---|---|---|
| 2,676,166 | 4/1954 | Weber ............................. | 260/85.7 |
| 3,399,128 | 8/1968 | Brewer et al. ...................... | 204/181 |
| 3,501,432 | 3/1970 | Wright et al. ...................... | 204/181 |
| 3,619,398 | 11/1971 | Bosso et al. ....................... | 204/181 |

*Primary Examiner*—Howard S. Williams
*Attorney, Agent, or Firm*—William J. Uhl

[57] ABSTRACT

Synthetic resins containing quaternary sulfonium base groups are prepared by reacting an epoxy-group containing material with a sulfide in the presence of an acid. The resins may contain epoxy groups or they may be essentially epoxy-group free, and may optionally contain oxyalkylene groups. When dispersed in water, the aqueous dispersion preferably contains boron. The resultant dispersion can be applied to a wide variety of substrates by electrodeposition and will deposit on the cathode to provide coatings of unique properties, including high resistance to corrosion and staining.

9 Claims, No Drawings

METHOD OF ELECTRODEPOSITING QUATERNARY SULFONIUM GROUP-CONTAINING RESINS

CROSS-REFERENCE TO RELATED APPLICATIONS

This application is a division of copending application Ser. No. 455,428, filed Mar. 27, 1974, now abandoned, which in turn is a continuation-in-part of copending application Ser. No. 292,360, filed Sept. 26, 1972, now abandoned, and a continuation-in-part of copending application Ser. No. 210,141, filed Dec. 20, 1971, now abandoned.

BACKGROUND OF THE INVENTION

Electrodeposition, although known for some time, has only recently become of commercial importance as a coating application method. While many compositions can be electrodeposited, most coating compositions when applied using electrodeposition techniques do not produce commercially usable coatings. Moreover, electrodeposition of many coating materials, even when otherwise successful, is attended by various disadvantages, such as non-uniform coatings and poor throw power. In addition, the coatings obtained are, in most instances deficient in certain properties essential for their utilization in many applications. In particular, properties such as corrosion resistance and alkali resistance are difficult to achieve with resins conventionally employed in electrodeposition processes. Likewise, staining and yellowing on baking or aging are problems which must be met to produce a commercially-successful resin for many applications. Anionic resins, due to their acidic nature, tend to be sensitive to common types of corrosive attack, for example, salts and alkalis. Many electro-depositable anionic coatings are subject to discoloration or staining because of dissolution of metal ions at the anode which is being coated.

Epoxy resins are among the most useful resins for many purposes and have excellent corrosion resistance and other properties. They are employed in many coatings, but have not been employed in water-dispersible compositions suitable for application by electrodeposition because they cannot be adequately dispersed in water under the conditions required in such processes. Esterified epoxies have been utilized, but these act similarly to the polycarboxylic acid resins, and while offering many advantages over such polycarboxylic acid resins, are still subject to many of their disadvantages.

Recently, there has been developed a group of water-dispersible, quaternary ammonium salt-containing resins which have utility as coating resins in general, and particularly, in aqueous electrodepositable compositions.

These resins are prepared by reacting an epoxy-group containing organic material, preferably a resin which is a polyepoxide containing a plurality of epoxy groups with an amine acid salt, yielding a resin preferably containing epoxy groups and contaning quaternary ammonium salt groups.

DESCRIPTION OF THE INVENTION

It has now been found that synthetic resins, which are prepared by reacting an epoxy group-containing organic material with a sulfide in the presence of an acid, and which are ungelled water-dispersible resins contaning chemically-bound quaternary sulfonium base groups and optionally containing epoxy groups and/or oxyalkylene groups can be utilized to provide clear or colloidal water solutions or dispersions. These compositions, when solubilized through ionization of the quaternary group and acid counter-ion, preferably where the acid counter-ion is derived from an acid having a dissociation constant greater than $1 \times 10^{-5}$, can be applied by electrodeposition to provide adherent coatings having excellent properties. When electrodeposited, they deposit on the cathode. When employed in aqueous compositions for electrodeposition, the above resins form the major resinous constituent of the composition, either as the sole resinous component or along with one or more other resinous or film-forming materials or crosslinking agents. When dispersed in water, the aqueous composition preferably contains boron.

Among the properties of the coatings herein are the desirable properties ordinarily associated with electrodepositable resins known heretofore and, in addition, the compositions herein provide coatings of unique advantages and properties. These include a high level of resistance to salt spray, alkali and similar corrosive elements, even over unprimed metals or untreated metals and in the absence of corrosion inhibiting pigments. The coatings are resistant to staining and discoloration which is often encountered with electrodeposited coatings based upon anionic type resins. Further, the resins of the invention have a substantial degree of resistance to yellowing on baking or aging and, therefore, are suitable for forming white or pastel colored coatings.

The resins of the invention are ungelled, water-dispersible resins having in their molecule chemically-bound quaternary sulfonium base salts, the quaternary sulfonium base salts preferably being salts of an acid having a dissociation constant greater than $1 \times 10^{-5}$, including organic and inorganic acids. Upon solubilization, at least a portion of the salt is preferably a salt of an acid having a dissociation constant greater than $1 \times 10^{-5}$. Optionally the resins can contain epoxy groups and/or oxyalkylene groups.

The quaternary sulfonium base salts are preferably salts of an organic carboxylic acid since it has been found that the use of such acids enhances the dispersibility of the compositions disclosed herein. The presently preferred acid is lactic acid. Preferably the resin contains at least about 0.1 percent and up to about 35 percent by weight sulfur in the form of chemically-bound quaternary sulfonium base salt groups.

The resins of the invention are formed by reacting an epoxy group-containing organic material with a sulfide in the presence of an acid to form quaternary sulfonium base salt group-containing resins.

The epoxy group-containing organic material can be any monomeric or polymeric compound or mixture of compounds having a 1,2-epoxy group. It is preferred that the epoxy-containing material have a 1,2-epoxy equivalency greater than 1.0, that is, in which the average number of 1,2-epoxy groups per molecule is greater than 1. It is preferred that the epoxy compound be resinous, that is, a polyepoxide, i.e., containing more than one epoxy group per molecule. The polyepoxide can be any of the well-known epoxides. Examples of these polyepoxides have, for example, been described in U.S. Pat. Nos. 2,467,171; 2,615,007; 2,716,123; 3,030,336; 3,053,855 and 3,075,999.

A preferred class of polyepoxides are the polyglycidyl ethers of polyphenols, such as Bisphenol A. These may be produced, for example, by etherification of a polyphenol with epichlorohydrin or dichlorohydrin in the presence of an alkali. The phenolic compound may be bis(4-hydroxyphenyl)1,1-ethane, bis(4-hydroxyphenyl)1,1-isobutane; bis(4-hydroxytertiary-butyl-phenyl)2,2-propane, bis(2-hydroxynaphthyl)methane, 1,5-dihydroxynaphthalene, or the like. Another quite useful class of polyepoxides are produced similarly from novolak resins or similar polyphenol resins.

Also suitable are the similar polyglycidyl ethers of polyhydric alcohols which may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, bis(4-hydroxycyclohexyl)2,2-propane, and the like.

There can also be used polyglycidyl esters of polycarboxylic acids which are produced by the reaction of epichlorohydrin or a similar epoxy compound with an aliphatic or aromatic polycarboxylic acid, such as oxalic acid, succinic acid, glutaric acid, terephthalic acid, 2,6-naphthylene dicarboxylic acid, dimerized linolenic acid, and the like. Examples are diglycidyl adipate and diglycidyl phthalate.

Also useful are polyepoxides derived from the epoxidation of an olefinically unsaturated alicyclic compound. Included are diepoxides comprising in part one or more monoepoxides. These polyepoxides are non-phenolic and are obtained by epoxidation of alicyclic olefins, for example, by oxygen and selected metal catalysts, by perbenzoic acid, by acetaldehyde monoperacetate, or by peracetic acid. Among such polyepoxides are the epoxyalicyclic ethers and esters, which are well known in the art.

Another often-preferred class of polyepoxides are those containing oxyalkylene groups in the epoxy molecule. Such oxyalkylene groups are typically groups of the general formula:

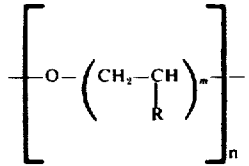

where R is hydrogen or alkyl, preferably lower alkyl (e.g., having 1 to 6 carbon atoms) and where, in most instances, m is 1 to 4 and n is 2 to 50. Such groups can be pendent to the main molecular chain of the polyepoxide or part of the main chain itself. The proportion of oxyalkylene groups in the polyepoxide depends upon many factors, including the chain length of the oxyalkylene groups, the nature of the epoxy and the degree of water solubility desired. Usually the epoxy contains at least about 1 percent by weight or more, and preferably 5 percent or more, of oxyalkylene groups.

Some polyepoxides containing oxyalkylene groups are produced by reaction some of the epoxy groups of a polyepoxide, such as the epoxy resins mentioned above, with a monohydric alcohol containing oxyalkylene groups. Such monohydric alcohols are conveniently produced by oxyalkylating an alcohol, such as methanol, ethanol, or other alkanol, with an alkylene oxide. Ethylene oxide, 1,2-propylene oxide and 1,2-butylene oxide are especially useful alkylene oxides.

Other monohydric alcohols can be, for example, the commercially-available materials known as Cellosolves and Carbitols, which are monoalkyl ethers of polyalkylene glycols. The reaction of the monohydric alcohol and the polyepoxide is generally carried out in the presence of a catalyst. Formic acid, dimethylethanolamine, diethylethanolamine, N,N-dimethylbenzylamine, and, in some cases, stannous chloride, are useful for this purpose.

Similar polyepoxides containing oxyalkylene groups can be produced by oxyalkylating the epoxy resin by other means, such as by direct reaction with an alkylene oxide.

The polyepoxide employed to produce the foregoing epoxies containing oxyalkylene groups should contain a sufficient number of epoxy groups so that the average number of residual epoxy groups per molecule remaining in the product after the oxyalkylation is greater than 1.0. When oxyalkylene groups are present, the epoxy resin preferably contains from about 1 to about 90 percent or more by weight of oxyalkylene groups.

Other epoxy-containing compounds and resins include nitrogeneous diepoxides such as disclosed in U.S. Pat. No. 3,365,471; epoxy resins from 1,1-methylene bis(5-substituted hydantoin), U.S. Pat. No. 3,391,097; bisimide containing diepoxides, U.S. Pat. No. 3,450,711; epoxylated aminomethyldiphenyl oxides, U.S. Pat. No. 3,312,664; heterocyclic N,N'-diglycidyl compounds, U.S. Pat. No. 3,503,979; amino epoxy phosphonates, British Pat. No. 1,172,916; 1,3,5-triglycidyl isocyanates, as well as other epoxy containing materials known in the art.

Another preferred class of resins which may be employed are acrylic polymers containing epoxy groups. These acrylic polymers are preferably polymers formed by copolymerizing an unsaturated epoxy-containing monomer, such as glycidyl acrylate or methacrylate.

Any polymerizable monomeric compound containing at least one $CH_2=C<$ group, peferably in terminal position, may be polymerized with the unsaturated glycidyl compounds. Examples of such monomers include:

1. Monoolefinic and diolefinic hydrocarbons, that is, monomers containing only atoms of hydrogen and carbon, such as styrene, alpha-methyl styrene, alpha-ethyl syrene, isobutylene (2-methyl propene-1), 2-methylbutene-1, 2-methyl-pentene-1, 2,3-dimethyl-butene-1, 2,3-dimethyl pentene-1, 2,4-dimethyl pentene-1, 2,3,3-trimethyl butene-1, 2-methyl heptene-1, 2,3-dimethyl hexene-1, 2,4-dimethyl hexene-1, 2,5-dimethyl hexene-1, 2-methyl-3-ethyl pentene-1, 2,3,3-trimethyl pentene-1, 2,3,4-trimethyl pentene-1,2-methyl octene-1, 2,6-dimethyl heptene-1, 2,6-dimethyl octene-1, 2,3-dimethyl decene-1, 2-methyl nonadecene-1, ethylene, propylene, butylene, amylene, hexylene, butadiene-1,2,isoprene, and the like;

2. Halogenated monoolefinic and diolefinic hydrocarbons, that is, monomers containing carbon, hydrogen, and one or more halogen atoms, such as alpha-chlorostyrene, alpha-bromostyrene, 2,5-dichlorostyrene, 2,5-dibromostyrene, 3,4-dichlorostyrene, ortho-, meta- and para-fluorostyrenes, 2,6-dichlorostyrene, 2,6-difluorostyrene, 3-fluoro-4chlorostyrene, 3-chloro-4-fluorostyrene, 2,4,5-trichlorostyrene, dichloromonofluorostyrenes, 2-chloropropene, 2-chlorobutene, 2-chloropentene, 2-chlorohexene, 2-chloroheptene, 2-bromobutene, 2-bromoheptene, 2-fluorohexene, 2-fluorobutene, 2-iodopropene, 2-iodopentene, 4- bromoheptene, 4-chloroheptene, 4-fluoroheptene, cis- and trans-1,2-dichloroethylenes, 1,2-dibromoethylene, 1,2-difluoroethylene, 1,2-diiodoethylene, chloroethylene (vinyl chloride), 1,1-dichloroethyelen (vinylidene chloride), bromoethylene, fluoroethylene, iodoethylene, 1,1-dibromoethylene, 1,1-fluoroethylene, 1,1-diiodoethylene, 1,1,2,2-tetrafluoroethylene, 1,-chloro-2,2,2-trifluoroethylene chlorobutadiene and other halogenated diolefinic compounds;

3. Esters of organic and inorganic acids, such as vinyl acetate, vinyl propionate, vinyl butyrate, vinyl isobutyrate, vinyl valarate, vinyl caproate, vinyl enanthate, vinyl benzoate, vinyl toluate, vinyl-p-chlorobenzoate, vinyl-o-chlorobenzoate and similar vinyl halobenzoates, vinyl-p-methoxybenzoate, vinyl-o-methoxybenzoate, vinyl-p-ethoxybenzoate, methyl methacrylate, ethyl methacrylate, propyl methacrylate, butyl methacrylate, amyl methacrylate, hexyl metacrylate, heptyl methacrylate, octyl methacrylate, decyl methacrylate, methyl crotonate, and ethyl tiglate;

Methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate, and dodecyl acrylate;

Isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl-p-chlorobenzoate, isopropyenyl-o-chlorobanzoate, isopropenyl-o-bromobenzoate, isopropenyl-m-chlorobenzoate, isopropenyl toluate, isopropenyl alpha-chloroacetate, and isopropenyl alpha-bromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate and vinyl alpha-bromovalerate;

Allyl chloride, allyl cyanide, allyl bromoide, allyl fluoride, allyl iodide, allyl chlorocarbonate, allyl nitrate, allyl thiocyanate, allyl formate, allyl acetate, allyl propionate, allyl butyrate, allyl valerate, allyl caproate, allyl-3,5,5-trimethyl hexoate, allyl benzoate, allyl acrylate, allyl crotonate, allyl oleate, allyl chloroacetate, allyl trichloroacetate, allyl chloropropionate, allyl chlorovalerate, allyl lactate, allyl pyruvate, allyl monoacetate, allyl acetoacetate, allyl thioacetate, as well as methallyl esters corresponding to the above allyl esters, as well as esters from such alkenyl alcohols as beta-ethyl allyl alcohol, beta-propyl allyl alcohol, 1-butene-4-ol, 2-methyl-butene-4-ol, 2(2,2-dimethylpropyl)-1-butene-4-ol, and 1-pentene-4-ol;

Methyl alpha-chloroacrylate, methyl alpha-bromacrylate, methyl alpha-fluoroacrylate, methyl alpha-iodoacrylate, ethyl alpha-chloroacrylate, propyl alpha-chloroacrylate, isopropyl alpha-bromoacrylate, amyl alpha-chloroacrylate, octyl alpha-chloroacrylate, 3,5,5-trimethylhexyl alpha-chloroacrylate, decyl alpha-chloroacrylate, methyl alpha-cyanoacrylate, ethyl alpha-cyanoacrylate, amyl alpha-cyanoacrylate and decyl alpha-cyano acrylate;

Dimethyl maleate, diethyl maleate, diallyl maleate, dimethyl fumarate, diethyl fumarate, dimethallyl fumarate and diethyl glutaconate;

4. Organic nitriles, such as acrylonitrile, methacrylonitrile, ethacrylonitrile, 3-octenenitrile, crotonitrile, oleonitrile, and the like.

In carrying out the polymerization reaction, techniques well known in the art may be employed. A peroxygen type catalyst is ordinarily utilized. Diazo compounds or redox catalyst systems can also be employed as catalysts.

The acrylic polymer may likewise be prepared with monomers of the type such that the final polymer contains potential crosslinking sites. Such monomers include acrylamides or methacrylamides, their N-methylol or N-methylol ether derivatives; unsaturated monomers containing capped isocyanate groups, or aziridyl groups; and hydroxyl-containing unsaturated monomers, for example, hydroxyalkyl acrylates.

Another method of producing acrylic polymers which may be utilized in this invention is to react an acrylic polymer containing reactive sites, such as carboxyl groups or hydroxyl groups, secondary amine groups or other active hydrogen-containing sites, with an epoxy-containing compound such as the diglycidyl ether of Bisphenol A or other polyepoxides as enumerated elsewhere herein, to provide an epoxy group-containing acrylic polymer.

Vinyl addition polymers which contain alicyclic unsaturation can be epoxidized to form an epoxy group-containing polymer.

Yet another class of polymers which are useful in preparing the resins of this $2H_4$ are isocyanate group-containing polyurethanes. The isocyanate-terminated polyurethane prepolymers employed as starting materials according to the present invention may be obtained by the reaction of a selected polymeric glycol. The polyurethane polymers include those which are prepared from polyalkylene ether glycols and diisocyanates. The term "polyalkylene ether glycol" as used herein refers to a polyalkylene ether which contains terminal hydroxy groups. These compounds are derived from the polymerization of cyclic ethers such as alkylene oxides or dioxolane or from the condensation of glycols. They are sometimes known as polyoxyalkylene glycols, polyalkylene glycols, or polyalkylene oxide glycols, or dihydric polyoxyalkylenes. Those useful in preparing the products of this invention may be represented by the formula $HO(RO)_nH$, in which R stands for an alkylene radical and n is an integer. Glycols containing a mixture of radicals, as in the compound $HO(CH_2OC_2O)_nH$, or $HO(C_2H_4O)_n(C_3H_6O)_m(C_2H_4O)_nH$, can be used. These glycols are either viscous liquids or waxy solids. Polytetramethylene ether glycols, also known as polybutylene ether glycols, may be employed. Polyethylene ether and polypropylene ether glycols, having the above-indicated formula, are among the preferred glycols. Polyethylene ether glycols, poly-1,2-propylene ether glycols, polydecamethylene ether glycols, and poly-1,2-dimethyl ethyl ether glycols are representative of other operative compounds. The presently preferred glycols are polypropylene glycols with a molecular weight between about 300 and about 1000.

Any of a wide variety of organic polyisocyanates may be employed in the reaction, including aromatic, aliphatic, and cycloaliphatic diisocyanates and combinations of these types. Representative compounds include aromatic diisocyanates, such as 2,4-tolylene diisocyanate, mixtures thereof with 2,6-tolylene diisocyanates (usually about 80/20, 4,4-methylene-bis(phenyl isocyanate) and m-phenylene diisocyanate, aliphatic compounds such as ethylene diisocyanate, methylene diisocyanate, propylene-1,2-diisocyanate, butylene-1,3- diisocyanate, tetramethylene diisocyanate, hexamethylene diisocyanate, and decamethylene diisocyanate and alicyclic compounds such as 1,2- and 1,4-cyclohexylene diisocyanates, 4,4'-methylene-bis(cyclohexylisocyanate) and isophorone diisocyanate are also operable. Arylene diisocyanates, i.e., those in which each of the two isocyanate groups is attached directly to an aromatic ring, react more rapidly with the polymeric glycols than do the alkylene diisocyanates. Compounds such as 2,4-tolylene diisocyanate in which the two isocyanate groups differ in reactivity are particularly desirable. The diisocyanates may contain other substituents, although those which are free from reactive groups other than the two isocyanate groups are ordinarily preferred. In the case of the aromatic compounds, the isocyanate groups may be attached either to the same or to different rings. Additional polyisocyanates which may be employed, for example, include: p,p'-diphenylmethane diisocyanate, 3,3'-dimethyl-4,4'-biphenylene diisocyanate, 3,3'-dimethoxyoxy-4,4'-biphenylene diisocyanate, 3,3'-diphenyl-4,4'-biphenylene diisocyanate, 4-chloro-1,3-phenylene diisocyanate, 3,3'-dichloro-4,4'-biphenylene diisocyanate, and 1,5-naphthalene diisocyanate, and other polyisocyanates in a blocked or semi-inactive form such as bis-phenylcarbamates of tolylene diisocyanate, p,p'-diphenylmethane diisocyanate, p-phenylene diisocyanate, and 1,5-naphthalene and 1,5-tetrahydronaphthalene diisocyanate.

Instead of the hydrocarbon portion of the polyester glycols used in forming these polyurethane products being entirely alkylene, it can contain arylene or cycloalkylene radicals together with the alkylene radicals as, for example, in the condensation product of a polyalkylene ether glycol with alpha, alpha'-dibromo-p-xylene in the presence of alkali. In such products, the cyclic groups inserted in the polyether chain are preferably phenylene, naphthylene or cyclohexylene radicals or those radicals containing alkyl or alkylene substituents as in the tolylene, phenylethylene or xylene radicals.

Also Pat. in the polyurethane products are those made from a substantially linear polyester and an organic diisocyanate of the type previously described. Products of this sort are described in U.S. Pats. Nos. 2,621,166; 2,625,531 and 2,625,532. The polyesters are prepared by reacting together glycols such as ethylene glycol, diethylene glycol, triethylene glycol, trimethylene glycol, 1,2-propylene glycol, tetramethylene glycol, 2,3-butylene glycol, pentamethylene glycol, and dicarboxylic acids such as malonic, maleic, succinic, adipic, pimelic, sebacic, oxalic phthalic, terephthalic, hexahydroterephthalic, and para-phenylene-diacetic acids, decamethylene dicarboxylic acid, and the like. Another useful group of compounds for this purpose are the polyester amide resins having terminal hydroxyl groups, the preferred polyesters may be represented by the formula HO[—B—ODC—B'OOC—COO]$_n$BOH in which B and B' are hydrocarbon radicals derived from the glycol and dicarboxylic acid respectively and n is an integer. In the preparation of these polyesters, the glycol is used in at least slight excess so that the polyesters contain terminal hydroxyl groups which are available for reaction with the isocyanates. The same polyisocyanates and reaction conditions useful in preparing polyurethanes from the polyalkylene ether glycols are also useful with the polyesters.

Polyurethane glycols may also be reacted with an organic polyisocyanate to give isocyanate-terminated polyurethanes for use as starting materials in the present invention. The starting polyurethane glycol is prepared by reacting a molar excess of a polymeric glycol with an organic diisocyanate. The resulting polymer is a polyurethane containing terminal hydroxyl groups which may then be further reacted with additional polyisocyanate to produce the starting isocyanate-terminated polyurethane prepolymer.

Another starting polyurethane prepolymer may be such as disclosed in U.S. Pat. No. 2,861,981, namely, those prepared from a polyisocyanate and the reaction product of an ester of an organic carboxylic acid with an excess of a saturated aliphatic glycol having only carbon atoms in its chain and a total of 8 to 14 carbon atoms, at least one two-carbon atom branch per molecule, and having terminal hydroxy groups separated by at least six carbon atoms.

It is obvious, from the above-described methods by which the polyurethane reaction products may be prepared and from the reactants used, that these products will contain a plurality of intralinear radicals of the formula —NH—CO—O—X—O—CO—NH—, wherein the bivalent radical —O—X—O— is obtained by removing the terminal hydrogen atoms of the polymeric glycol, said glycol being selected from the group consisting of polyalkylene ether glycols, polyurethane glycols, polyalkylene arylene ether glycols, polyalkylene-cycloalkylene ether glycols, polyalkylene ether-polythioether glycols, polyester amide glycols of the formula:

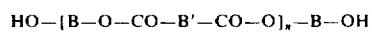

where B and B' are hydrocarbon radicals and n is an integer, and that a typical isocyanate-terminated polyurethane polymer produced from diisocyanates and dihydric glycols will, on an average, contain, at a 2:1 NCO—OH ratio, a plurality of intralinear molecules conforming to the formula:

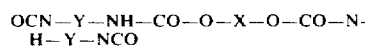

wherein —O—X—O— has the value given previously and Y is the polyisocyanate hydrocarbon radical.

In the preparation of the starting polyurethane polymer, an excess of the organic polyisocyanate of the polymeric glycol is used, which may be only a slight excess over the stoichiometric amount (i.e., one equivalent of polyisocyanate for each equivalent of the polymeric glycol). In the case of a diisocyanate and a dihydric polyalkylene ether, the ratio of NCO to OH of the polyol will be at least one and may be up to a 3:1 equivalent ratio. The glycol and and the isocyanate are ordinarily reacted by heating with agitation at a temperature of 50°C. to 130°C., preferably 70°C. to 120°C. The ratio of organic polyisocyanate compound to polymeric glycol is usually and preferably between about 1.3:1 and 2.0:1.

The reaction is preferably, but not necessarily, effected in the absence of a solvent, when the prepolymer is a fluid at processing temperatures. When it is not, or when it is desired to employ a solvent, convenient solvents are inert organic solvents having a boiling range above about 90°C. when the reaction is to be carried out in open equipment. Lower boiling solvents may, of course, be used where the reaction is carried out in closed equipment to prevent boiling off the solvent at the temperatures of the reaction. Solvents boiling at substantially more than 140°C. are difficult to remove from a final chain-extended elastomer at desirable working temperatures, although it will be obvious that higher boiling solvents may be employed where the excess solvent is removed by means other than by heating or distillation. The solvent, when used, may be added at the beginning, at an intermediate point, or at the end of the prepolymer reaction stage, or after cooling of the formed prepolymer. The solvents to be used are preferably those in which the reactants have some solubility but in which the final chain-extended product is insoluble. Ketones, tertiary alcohols and esters may be used. The aliphatic hydrocarbon solvents such as the heptanes, octanes and nonanes, or mixtures of such hydrocarbon obtained from naturally-occurring petroleum sources such as kerosene, or from synthetically prepared hydrocarbons, may sometimes be employed. Cycloaliphatic hydrocarbons such as methylcyclohexane and aromatic hydrocarbons such as toluene may likewise be used. Toluene and isopropyl acetate are preferred solvents. The amount of solvent used may be varied widely. From 25 to 400 parts of solvent per 100 parts of glycol have been found to be operable. The excess solvent, where large amounts are employed, may be separated partially or completely from the polymer prior to emulsification in the water solution. If an emulsion technique is to be employed in the chain extension; sometimes the excess solvent is useful and is allowed to remain during the emulsification stage.

The reactants are cooked for a period sufficient to react most, if not all, of the hydroxy groups, whereafter the prepolymer is allowed to stand and the free NCO content determined.

Usual pHs are employed during preparation of the prepolymer the reaction preferably being maintained substantially neutral. Base accelerate the reaction, acids retard the reaction, and preferably neither are added.

These isocynate group-containing polyurethane are then reacted with an epoxy-containing compound such as glycidol, for example, at temperatures of about 25°C. to about 45°C., usually in the presence of a catalyst which promotes urethane formation.

The resins of the invention are formed by reacting the epoxy compound with a sulfide in the presence of an acid to form quaternary sulfonium base group-containing resins.

The sulfide employed may be virtually any sulfide which reacts with epoxy groups and which does not contain interfering groups. For example, the sulfide may be aliphatic, mixed aliphatic-aromatic, aralkyl or cyclic. Examples of such sulfides include diethyl sulfide, dipropyl sulfide, dibutyl sulfide, diphenyl sulfide, dihexyl sulfide, ethyl phenyl sulfide, tetramethylene sulfide, pentamethylene sulfide, bis-(2-hydroxyethyl)-sulfide (thiodiethanol), thiodipropanol, thiodibutanol, and the like.

The acid employed may be virtually any acid which forms a quaternary sulfonium salt. Preferably the acid is an organic carboxylic acid. Examples of acids which may be employed are boric acid, formic acid, lactic acid, acetic acid, propionic acid, butyric acid, hydrochloric acid, phosphoric acid and sulfuric acid, the presently preferred acid being lactic acid. Preferably the acid is an acid having a dissociation constant greater than about $1 \times 10^{-5}$.

The ratio of sulfide to acid is not unduly critical. Since one mole of acid is utilized to form one mole of sulfonium group, it is preferred that at least about one mole of acid be present for each mole of desired sulfide to sulfonium conversion.

The sulfide-acid mixture and the epoxy compound are reacted by mixing the components, usually at moderately elevated temperatures such as 70°–110°C. If lower temperatures are used, quaternary sulfonium groups are not generally formed. A solvent is not necessary, although one is often used in order to afford better control of the reaction. Aromatic hydrocarbons, monoalkyl ethers of ethylene glycol, aliphatic alcohols are suitable solvents. The proportions of the sulfide and the epoxy compound can be varied and the optimum proportions depend upon the particular reactants. Ordinarily, however, from about one part to about 50 parts by weight of the sulfide per 100 parts of epoxy compound is employed. The proportions are usually chosen with reference to the amount of sulfur, which is typically from about 0.1 to about 35 percent, based on the total weight of the sulfide in the sulfide-acid mixture, and the epoxy compound. Since the sulfide salt reacts with the epoxide groups of the epoxy resin employed, in order to provide an epoxy group-containing resin, less sulfide than the stoichiometric equivalent of the epoxide groups present is employed, so that the final resin is provided with one epoxy group per average molecule. Similarly, if an epoxy free resin is desired, a stoichiometric amount or excess of sulfide is used.

It is also to be recognized that useful compositions can be produced by first reacting a thiol or a mercaptan-type material (i.e., a material of the general formula R-SH, where R can be essentially any organic radical) with the epoxy group containing material, and then adding an acid and subsequently heating the reaction mixture to a suitable reaction temperature as hereinafter indicated. The thiol, or mercaptan, and the epoxy groups are reacted until a sulfide is formed. The addition of the acid then forms a sulfide-acid mixture as hereinbefore set forth, which mixture, upon heating, will then react with any residual epoxy groups present. In the event no epoxy groups are present after the sulfide-acid mixture formation is complete, an additional epoxy material must be added.

The aqueous dispersions of the instant invention may also contain boron. The boron can be added to the dispersion by adding an aqueous solution of boric acid, or acid itself, or a compound hydrolyzable to form boric acid in aqueous medium. Alternatively, the acid utilized with the sulfide may be boric acid.

In still another embodiment, the epoxy compounds decribed above may be reacted with an ester of boric acid or a compound which can be cleaved to form boric acid in a medium containing water and preferably an amino containing boron ester and/or a tertiary amine salt of boric acid to produce epoxy reaction products. If this approach is chosen, the final composition will contain quaternary ammonium groups. Thus, in order to insure that epoxy groups remain for the subsequent quaternary sulfonium group formation, that amount of boron compound used should be such that less then one equivalent amine nitrogen (of the boron compound) is present for every epoxy group present.

The hydrolyzable boron compound utilized in producing the reaction products or to be added to the dispersion can be, for example, any triorganoborate in which at least one of the organic groups is substituted with an amino group. Structurally, such esters are esters of boric acid or a dehydrated boric acid such as metaboric acid and tetraboric acid, although not necessarily produced from such acids. In most cases the boron esters employed correspond to one of the general formulas:

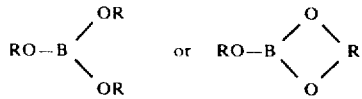

where the R groups are the same or different organic groups. The groups representated by R above can be virtually any organic group, such as hyrocarbon or substituted hydrocarbon, usually having not more than 20 carbon atoms and preferably not more than about 8 carbon atoms. The preferred esters have alkyl groups of polyoxyalkyl groups. At least one of the organic groups contains an amine group, i.e., a group of the structure:

where $R_1$ and $R_2$ are hydrogen or preferably methyl, ethyl or other lower alkyl groups but can be essentially any other organic radical, so long as they do not interfere with the desired reaction. The nature of the particular groups is less important than the presence of an amino nitrogen atom, and thus higher alkyl, aryl, alkaryl, aralkyl and substituted groups of these types can be present. While both $R_1$ and $R_2$ can be hydrogen (i.e., the amino group is a primary amino group), it is preferred that at least one be an alkyl or other organic group, so that the amino group is secondary or tertiary.

The preferred boron esters correspond to the formula:

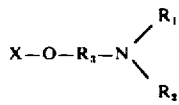

where X has the structure:

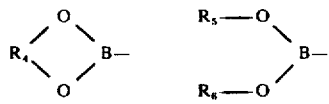

$R_3$ and $R_4$ being divalent organic radicals, such as alkylene or substituted alkylene, e.g., oxyalkylene or poly(oxyalkylene), or, less desirably, arylene, alkarylene or substituted arylene. $R_5$ and $R_6$ can be alkyl, substituted alkyl, aryl, alkaryl, or other residue from essentially any monohydroxy alcohol derived by removal of the hydroxyl group. $R_5$ and $R_6$ can be the same or different.

Examples of boron esters within the above class include:

2-(beta-dimethylaminoisopropoxy)-4,5-dimethyl-1,3,2-dioxaborolane
2-(beta-diethylaminoethoxy)-4,4,6-trimethyl-1,3,2-dioxaborinane
2-(beta-dimethylaminoethoxy)-4,4,6-trimethyl-1,3,2-dioxaborinane
2-(beta-diisopropylaminoethoxy)-1,3,2-dioxaborinane
2-(beta-dibutylaminoethoxy)-4-methyl-1,3,2-dioxaborinane
2-(beta-diethylaminoethoxy)-1,3,2-dioxaborinane
2-(gamma-aminopropoxy)-4-methyl-1,3,2-dioxaborinane
2-(beta-methylaminoethoxy)-4,4,6-trimethyl-1,3,2-dioxaborinane
2-(beta-ethylaminoethoxy)-1,3,6-trioxa-2-boracyclooctane
2-(gamma-dimethylaminoethoxy)1,3,6,9-tetraoxa-2-boracycloundecane
2-(beta-dimethylaminoethoxy)-4-(4-hydroxybutyl)-1,3,2-dioxaborolane Reaction product of $(CH_3)_2NCH_2CH_2OH$ + lactic acid +$B_2O_3$ + neopentyl glycol A number of such boron esters are known. Many are described, for example, in U.S. Pat. Nos. 3,301,804 and 3,257,442. They can be prepared by reacting one mole of boric acid (or equivalent boric oxide) with at least 3 moles of alcohol, at least one mole of the alcohol being an amino-substituted alcohol. The reaction is ordinarily carried out by refluxing the reactants with removal of the water formed.

The reaction of the boron compound may be conducted simultaneously with sulfonium group formation since the reaction conditions for this reaction are similar.

The sulfide-acid mixtures and the epoxy compound are preferably reacted by mixing the components in the presence of a sufficient amount of water to provide an exothermally controlled reaction. The amount of water employed should be that amount of water which allows for smooth reaction. Typically, water is employed as the basis of about 1.75 percent to about 20 percent by weight, based on total reaction mixture solids, and preferably about 2 percent to about 15 percent by weight, based on total reaction solids.

The particular reactants, proportions and reaction conditions should be chosen in accordance with considerations well-known in the art, so as to avoid gellation of the product during the reaction. For example, excessively severe reaction conditions should not be employed. Similarly, compounds having reactive substituents should not be utilized along with epoxy compounds with which those substituents might react adversely at the desired conditions.

The product forming the resin of the invention may be crosslinked to some extent; however, it remains soluble in certain organic solvents and can be further cured to a hard, thermoset state. It is significantly characterized by its chemically-bound quaternary sulfonium content.

Aqueous compositions containing the above reaction products are highly useful as coating compositions and can be applied by any conventional method, such as by dipping, brushing, etc. They are, however, eminently suited to application by electrodeposition.

As previously indicated, the resins herein described may contain free epoxy groups or may be essentially epoxy group free. The stoichiometry of the reactants forming quaternary sulfonium groups from the starting epoxy material is adjusted so that all epoxy groups are reacted or so that epoxy groups remain after quaternary sulfonium formation, they may be further reacted without crosslinking to modify the resin properties.

Where the vinyl resin has crosslinkable sites such as free epoxy groups, hydroxyl groups, or other reactive sites, there may be usefully incorporated into the aqueous composition a crosslinking resin, for example, an amine aldehyde resin and/or an unsaturated methylol phenol ether.

The amine-aldehyde products employed herein are aldehyde condensation products of melamine, urea, benzoguanamine, or a similar compound. They may be water-soluble or they may be organic solvent-soluble. Generally, the aldehyde employed is formaldehyde, although useful products can be made from other aldehydes, such as acetaldehyde, crotonaldehyde, acrolein, benzaldehyde, furfural, and others. Condensation products of melamine, urea and benzoguanamine are the most common and are preferred, but products of other amines and amides in which at least one amino group is present can also be employed.

For example, such condensation products can be produced from triazines, diazines, triazoles, guanadines, guanamines, and alkyl and aryl-substituted melamines. Some examples of such compounds are N,N'-dimethyl urea, benzyl urea, N,N'-ethylene urea, diazine diamine, formaguanamine, acetoguanamine, 2-chloro-4,6-diamine-1,3,5-triazine, 3,5-diaminotriazole, 4,6-diaminopyrimidine, 2,4,6-triphenyltriamine-1,3,5-triazine, and the like.

The aldehyde condensation products contain methylol groups or similar alkylol groups, depending upon the particular aldehyde employed. Ordinarily, in producing amine-aldehyde condensation products, all or part of these methylol groups are etherified by reaction with an alcohol to produce an alkylated product. In the present invention, there are employed those condensation products which are substantially completely alkylated. By this it is meant that all or substantially all of the methylol groups have been etherified. Generally speaking, those products containing not more than an average of about one unalkylated alkylol group per molecule are utilized.

Various alcohols can be employed for the etherification of the alkylol groups. These include essentially any monomeric alcohol, with the preferred alcohols being methanol, ethanol, propanol, butanol, and other lower alkanols having up to about 5 carbon atoms, including isomers such as 2-methyl-1-propanol. There can also be employed alcohols such as the lower alkyl monoethers of ethylene glycol and the like; for instance, ethyl Cellosolve and butyl Cellosolve. Higher alcohols can be used but are less desirable because they tend to affect the film properties of the baked film. When the alkylated amine-aldehyde condensate is to be utilized in a vehicle to be employed in a water-dispersed coating composition, it is preferred to employ a water-soluble alcohol in the etherification.

The amine-aldehyde condensation products are produced in a manner well-known in the art, using acidic or basic catalysts and varying conditions of time and temperature. The aldehyde is often employed as a solution in water or alcohol, and the condensation, polymerization and etherification reactions may be carried out either sequentially or simultaneously.

The methylolphenol ethers employed herein are compositions consisting essentially of one or more methylolphenol ethers of the formula:

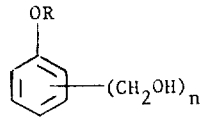

where $n$ is an integer from 1 to 3 and R is an unsaturated aliphatic group or a halogen-substituted unsaturated aliphatic group. The groups represented by R should contain at least 3 carbon atoms and can be, for example, allyl groups (which are preferred) or others such as methallyl, crotyl, butenyl, or the like. The halogen-substituted unsaturated groups represented by R can be various mono- and poly-halogenated derivatives of the above unsaturated aliphatic groups, for example, 2-chlorallyl, 3-chloroallyl, 3-chloro-2-methallyl, 1-chloro-2-butenyl, and corresponding groups containing other halogens such as bromine and fluorine.

The methylolphenol ether compositions employed herein are described in U.S. Pat. No. 2,579,330, and, as disclosed therein, can be produced from sodium and barium salts or 2,4,6-tris(hydroxymethyl)phenols which are obtained by reacting formaldehyde with phenol in the presence of sodium or barium hydroxide. Several methylolphenol ether compositions of this type are commercially available and these generally comprise mixtures of allyl ethers of mono-, di- and trimethylolphenols (substituted in the ortho-, para, and meta positions). The trimethylolated derivative is generally the predominant component of the composition. Such commercially available methylolphenol ether compositions are preferred for use in the invention.

The proportion of amine-aldehyde products and/or phenol ether and quaternary-containing resin in the coating composition can be varied considerably. The optimum amount employed depends upon the particular properties desired in the product and also depends in part on the particular quaternary onium group-containing resin. In the preferred products, the amine-aldehyde products or the phenol ethers comprise from about 2 to about 30 percent by weight, based on the weight of the combination with quaternary onium group-containing resins, although as little as one percent give some degree of improvement in properties of the composition and as much as about 50 percent can be utilized in some cases. Where both amine-aldehyde product and phenol ether are utilized, generally a combined weight of between about one percent and about 50 percent by weight may be employed, preferably between about two percent and about 30 percent. The ratio of amine-aldehyde product and phenol ether is generally about 100:1 to 1:100, and preferably between about 5:1 and 1:5.

Yet another crosslinking agent to the polymers of the invention containing coreactive groups are capped or blocked isocyanates. The capped or blocked isocyanates which may be employed in the compositions of the invention may be any isocyanate where the isocyanato groups have been reacted with a compound so that the resultant capped isocyanate is stable to amine groups at room temperature but reactive with amine groups at elevated temperatures, usually between about 200°F. and about 600°F.

In the preparation of the blocked organic polyisocyanate, any suitable organic polyisocyanate may be used. Representative examples are the aliphatic compounds such as trimethylene, tetramethylene, pentamethylene hexamethylene, 1,2-propylene, 1,2-butylene, 2,3-butylene, 1,3-butylene, ethylidine and butylidene diisocyanates; the cycloalkylene compounds such as 1,3-cyclopentane, 1,4-cyclohexane, and 1,2-cyclohexane diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-tolylene, or mixtures thereof, 4,4'-toluidine and 1,4-xylylene diisocyanates; the nuclear substituted aromatic compounds such as dianisidine diisocyanate, 4,4'-diphenylether diisocyanate and chlorodiphenylene diisocyanate; the triisocyanates, such as triphenyl methane-4,4',4''-triisocyanate, 1,3,5-triisocyanate benzene and 2,4,6-triisocyanate toluene; and the 2,4,6-triisocyanate toluene; and the tetraisocyanates, such as 4,4'-diphenyl-dimethyl methane-2,2'-5,5'-tetraisocyanate; the polymerized polyisocyanates such as tolylene diisocyanate dimers and trimers, and the like.

In addition, the organic polyisocyanate may be a prepolymer derived from a polyol including polyether polyol or polyester polyol, including polyethers which are reacted with excess polyisocyanates to form isocyanate terminated prepolymers may be simple polyols such as glycols, e.g., ethylene glycol and propylene glycol, as well as other polyols such as glycols, e.g., ethylene glycol and propylene glycol, as well as other polyols such as glycerol, trimethylolpropane, hexanetriol, pentaerythritol, and the like, as well as monoethers such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxy-terminated polyethers and can be linear or branched. Examples of polyethers include polyoxyethylene glycol having a molecular weight of 1540, polyoxypropylene glycol having a molecular weight of 1025, polyoxytetramethylene glycol, polyoxyhexamethylene glycol, polyoxynonamethylene glycol, polyoxydecamethylene glycol, polyoxydodecamethylene glycol and mixtures thereof. Other types of polyoxyalkylene glycol ethers can be used. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures; glycerol, trimethylolethane, trimethylolpropane, 1,2,6-hexanetriol, pentaerythritol, sorbitol, methyl glucosides, sucrose and the like with alkylene oxides such as ethylene oxide, propylene oxide, their mixtures, and the like.

Any suitable aliphatic, cycloaliphatic or aromatic alkyl monoalcohol may be used as a blocking agent in accordance with the present invention, such as, for example, aliphatic alcohols, such as methyl, ethyl, chloroethyl, propyl, butyl, amyl, hexyl, heptyl, octyl, nonyl, 3,3,5-trimethylhexanol, decyl, and lauryl alcohols, and the like; the cycloaliphatic alcohols, such as, for example, cyclopentanol, cyclohexanol, and the like, the aromatic-alkyl alcohols, such as phenylcarbinol, methylphenylcarbinol, and the like. Minor amounts of even higher molecular weight, relatively non-volatile monoalcohols may be used, if desired, to serve as plasticizers in the coatings provided by this invention.

Additional blocking agents include hydroxyl amines, such as ethanolamine and oximes, such as methylethyl ketone oxime, acetone oxime, and cyclohexanone oxime.

The organic polyisocyanate-blocking agent adduct is formed by reacting a sufficient quantity of alcohol with the organic polyisocyanate to insure that no free isocyanate groups are present. The reaction between the organic polyisocyanate and the blocking agent is exothermic; therefore, the polyisocyanate and the blocking agent are preferably admixed at temperatures no higher than 80°C. and preferably, below 50°C. to minimize the exotherm effect.

Generally the amount of capped isocyanate employed with the resins of the invention is such as to provide between about 0.5 and about 2.0 urethane groups per coreactive group contained in the resin molecule.

The pressure of a boron compound in the electrodeposited film is of substantial benefit in that boron compounds apparently catalyze the cure of the deposited film, allowing lower cure temperatures and/or harder films. Where the resin is first prepared without the presence of boron and/or additional boron is desired when the resin is dispersed, a compound of boron may be added, preferably boric acid or a precursor thereof.

The acid or acidic solubilizing agent is preferably any acid having a dissociation constant greater than $1 \times 10^{-5}$. Preferably, the acid or acidic solubilizing agent should be an organic acid having a dissociation constant greater than about $1 \times 10^{-5}$, the presently preferred acid being lactic acid. The addition of acid aids in stabilizing the resin, since the epoxy may tend to further polymerize on storage under highly alkaline conditions. In some cases the acid also helps to obtain more complete dissolution of the resin. It is also desirable to electrodeposit these coatings from an acidic or only slightly basic solution (e.g., having a pH between about 3 and about 8.5), and the addition of acid thus is often useful to achieve the desired pH.

The resin of the invention, when placed in a water-containing medium, such as an electrodeposition high solids feed concentrate or the electrodeposition bath, changes character. Since frequently the boron, if present and chemically-bonded, is apparently weakly chemically-bound in the resin, it is subject to cleavage from the resin molecule and, while the boron electrodeposits with the resin and is found in the electrodeposited film, the boron may be removed from the water-containing medium in whole or in part by separation means, such as electrodialysis or ultrafiltration, in the form of boric acid.

The resin in aqueous medium can be characterized as a water-containing medium containing an ungelled water-dispersible resin containing chemically-bound quaternary sulfonium base salts and optionally containing epoxy groups.

The resin preferably contains from about 0.1 to about 35 percent by weight sulfur being in the form of chemically-bound quaternary sulfonium base salt groups; said water-containing medium containing in the preferred embodiment from about 0.01 to about 8 percent by weight of boron contained in boric acid and/or a borate or boric acid complex.

The concentration of the product in water depends upon the process parameters to be used and is, in general, not critical, but ordinarily the major proportion of the aqueous composition is water, e.g., the composition may contain from one to 25 percent by weight of the resin.

Preferably, the electrodepositable compositions of the invention contain a coupling solvent. The use of a coupling solvent provides for improved deposited film appearance. These solvents include hydrocarbons, alcohols, esters, ethers, and ketones. The preferred coupling solvents include monoalcohols, glycols, and polyols as well as ketones and ether alcohols. Specific coupling solvents include isopropanol, butanol, isophorone, pentoxone (4-methoxy-4-methyl pentanone-2), ethylene and propylene glycol, the monomethyl, monoethyl and monobutyl ethers of ethylene glycol, 2-ethylhexanol and hexyl Cellosolve. The presently preferred coupling solvent is 2-ethylhexanol. The amount of solvent is not unduly critical, generally between about 0.1 percent and about 40 percent by weight of the dispersant may be employed, preferably between about 0.5 and about 25 percent by weight of the dispersant is employed.

While the resins hereinabove described may be electrodeposited as substantially the sole resinous component of the electrodeposited composition, as noted earlier it is frequently desirable in order to improve or modify film appearance and/or film properties, to incorporate into the electrodepositable compositions various non-reactive and reactive compounds or resinous materials such as plasticizing material, including N-cyclohexyl-p-toluene sulfonamide, ortho- and para-toluene sulfonamide, N-ethyl-ortho- and para-toluene sulfonamide, aromatic and aliphatic polyether polyols, phenol resins including allyl ether containing phenolic resins, liquid epoxy resins, quadrols, polycaprolactones; triazine resins such as melamine-based resins and benzoguanamine-based resins, especially alkylated formaldehyde reaction products thereof; urea formaldehyde resins, acrylic resins, hydroxy and/or carboxyl group-containing polyesters and hydrocarbons resins.

Other materials include esters such as butylbenzyl phthalate, dioctyl phthalate, methyl phthalylethyl glycolate, butylphthalylbutyl glycolate, cresyl diphenyl phosphate, 2-ethylhexyl diphenyl phosphate, polyethylene glycol 200 dibenzoates, as well as polyesters, 2,2,4-trimethyl pentanediol monoisobutyrate (Texanol).

In most instances, a pigment composition and, if desired, various additives such as anti-oxidants, surfactants, or wetting agents, for example, Foam Kill 639 (a hydrocarbon oil-containing inert diatomaceous earth), as well as glycolated acetylenes (the Surfynols, for example), sulfonates, sulfated fatty amides, and alkylphenoxypolyoxyalkylene alkanols, and the like, are included. The pigment composition may be of any conventional type, comprising, for example, iron oxides, lead oxides, strontium chromate, carbon black, titanium dioxide, talc, barium sulfate, as well as color pigments such as cadmium yellow, cadmium red, chromic yellow, and the like.

In the electrodeposition processes employing the aqueous coating compositions described above, the aqueous composition is placed in contact with an electrically-conductive anode and an electrically-conductive cathode, with the surface to be coated being the cathode, while in contact with the bath containing the coating composition, an adherent film of the coating composition is deposited on the cathode. This is directly contrary to the processes utilizing polycarboxylic acid resins, as in the prior art, and the advantages described are, in large part, attributed to this cathodic deposition.

The conditions under which the electrodeposition is carried out are, in general, similar to those used in electrodeposition of other types of coatings. The applied voltage may be varied greatly and can be for example, as low as one volt or as high as several thousand volts, although typically between 50 and 500 volts. The current density is usually between about 1.0 ampere and 15 amperes per square foot, and tends to decrease during electrodeposition.

The exact nature of the electrodeposited film is not known with certainty. The resin of the invention when freshly electrodeposited on the cathode may contain quaternary sulfonium base groups. The acid moiety whigh forms the salt migrates at least in part toward the anode. Where the electrodeposition bath contains boron, the electrodeposited resin further contains boron which may be bonded with the basic groups present in the film which has electrodeposited upon the cathode. The amounts of bonded boron in the electrodeposited film apparently increases with increasing boron concentration in the bath to a saturation value, dependent on the number of basic groups in the concentration and the basicity of the base groups. It is also possible that upon deposition the quaternary sulfonium salt dissociates to an essentially non-charged or charge free composition.

The film, while it may be crosslinked to some extent, remains soluble in certain organic solvents.

The method of the invention is applicable to the coating of any conductive substrate, and especially metals such as steel, aluminum, copper, magnesium, or the like. After deposition, the coating is cured, usually by baking at elevated temperatures. Temperatures of 250°C. to 500°C. for one to 30 minutes are typical baking schedules utilized.

During the cure, especially at elevated temperatures, it is believed that at least a substantial portion of the quaternary sulfonium base decomposes to sulfides (assuming that the deposited film does, in fact, contain quaternary sulfonium groups), which aids in the crosslinking of the coating, which upon curing is infusible and insoluble. The presence of boron salts and complexes in the film increases the rate of crosslinking, reduces the temperatures necessary for acceptable curing in commercially-reasonable times and produces coatings with improved hardness and corrosion resistance.

As set forth above, the significant resin constituents are (A) a resin derived from an epoxy containing organic material, and, optionally, oxyalkylene groups; (B) quaternary sulfonium groups, as salts of acids, preferably having a dissociation constant greater than 1 $\times$ $10^{-5}$, and, optionally, (C) boron. All these components may be qualitatively and quantitatively determined by numerous methods known in the art.

Epoxy groups may be determined by the well-known pyridinium hydrochloride method as described, for example, in Siggia, "QUANTITATIVE ORGANIC ANALYSIS VIA FUNCTIONAL GROUPS", John Wiley & Sons, Inc., New York (1963), page 242.

The total base groups present in the polymer, including quaternary groups present, may be determined on a separate resin sample. Usually the resin sample will be neutral. If, however, the resin is basic, the sample should be neutralized with a known amount of the acid present in the resin as a salt. Where the acid present in the resin as a salt is a weak acid as compared to HCl, the resin is titrated as HCl and back-titrated with sodium hydroxide on an automatic titrator. The HCl titration yields the total base groups present. For example, a typical analysis is conducted as follows: a 10 milliliter sample of an about 10 percent solids electrodeposition bath is pipetted into 60 milliliters of tetrahydrofuran. The sample is titrated with 0.1000 normal HCl to the pH end point. The amount of standard acid used is equivalent to the quaternary base present. The sample is then back titrated with 0.100 normal sodium hydroxide to give a titration curve with multiple end points. In a typical instance, the first end point corresponds to excess HCl. From the HCl titration, the second end point corresponds to the neutralization of the weak acid (for example, lactic acid). The difference in volume between the two endpoints gives the volume of standard base equivalent to the weak acid content of the sample.

Whereas solvent such as propylene glycol is employed with, for example tetrahydrofuran to maintain sample homogeneity, boron present will also titrate since the boron in the form present forms an acid complex with the propylene glycol. Under the conditions specified, the boric acid may be distinguished from the weak acid (e.g., lactic) by an additional inflection point in the pH titration curve.

In the case of the presence of acid salts of strong acids, other methods must be employed to determine acid, and quaternary groups present. For example, where the resin contains quaternary hydrochloride groups, the resin may be dispersed, for example, in a mixture of glacial acetic acid and tetrahydrofuran, the chloride complexed with mercuric acetate and the sample titrated with perchloric acid to yield the quaternary groups.

Boron may be determined as described by R. S. Braman, "Boron Determination", ENCYCLOPEDIA OF INDUSTRIAL CHEMICAL ANALYSIS, F. D. Snell and Hilton, Editors, John Wiley & Sons, Inc., New York (1968), Volume 7, pages 384–423. The boron may be determined on a separate sample. For example, by pipetting a 10 milliliter sample of an approximately 10 percent solid cationic electrodeposition bath into 60 milliliters of distilled water. Sufficient HCl is then added to lower the pH to about 4.0. The sample is then back-titrated with 0.1000 normal sodium hydroxide, using a Metrohm Potentiograph E-436 automatic titrator or equivalent apparatus, to the first inflection point in the pH titration curve. There is then added 7 grams of mannitol. The solution becomes acid and titration is then continued to the second inflection point in the pH titration curve. The amount of base consumed between the first and second end points is the measure of the number of moles of boric acid complex formed in the sample.

The above description is exemplary of the technique employed to quantitatively and qualitatively identify the groups present. In specific case, analytical techniques may be adapted to a specific resin; however, in each case, consistent with the above description, there exist methods known in the art which yield appropriate accurate determinations of the significant chemical moiety content.

Illustrating the invention are the following examples, which, however, are not to be construed as limiting the invention to their details. All parts and percentages in the examples, as well as throughout this specification, are by weight unless otherwise specified.

EXAMPLE I

Into a reactor equipped with thermometer, stirrer, distillation apparatus, with reflux condenser, water trap and means for providing an inert gas blanket were charged 885 parts of Epon 829 together with 151 parts of Bisphenol A. The mixture was heated to 170°C. and held at 185°C. for 45 minutes. The reaction mixture was then cooled to 160°C. and there was then added 425 parts polypropylene glycol 600, together with 2.7 parts of dimethylaminoethanol. The reaction mixture was held at 135°C. until the reaction mixture attained a Gardner-Holdt viscosity of R (about 6 hours), the Gardner-Holdt viscosity being measured as a 50 percent solids solution in 90/10 isophorone/toluene. The 50 percent solution had an epoxide equivalent of 1922 and a hydroxyl value of 143. There was then added 1.8 parts of 90 percent formic acid to neutralize the catalyst present.

To the reaction mixture at 100°C. was then added 75 parts of isopropanol. To the reaction mixture at 80°C. there was then added a solution of 104 parts of thiodiethanol in 90 parts of 85 percent lactic acid, and 80 parts isopropanol. This mixture was added over a 20-minute period, the temperature rising to 90°C. The reaction mixture was held at 95°C. for 8 minutes after the completion of the addition. There was then added 488 parts of deionized water, 7.4 parts of a surfactant (Foam-Kill 639) and 95 parts of 2-ethylhexanol. The resultant 65 percent solids solution had an epoxide equivalent of 3199 and a hydroxyl value of 70. This material is hereinafter identified as the vehicle resin.

In a manner similar to the above, a grinding vehicle resin was prepared, with the exception that after the addition of polypropylene glycol 600 and dimethylaminoethanol, the reaction mixture was held for approximately 4 hours to a Gardner-Holdt viscosity of M, measured in the same manner as above. The product at 50 percent solids had an epoxy equivalent of 1649 and a hydroxyl value of 135.

After addition of formic acid to neutralize the catalyst, there was then added a solution of 208 parts of thiodiethanol, 180 parts of 85 percent lactic acid in 80 parts of isopropanol. The mixture was added to the previous reaction mixture at 82°C. over a 20-minute period, the temperature rising to about 90°C. The reaction mixture was held at 91°–95°C. for 8 minutes, after the addition was complete.

To this reaction product was added 488 parts of deionized water, 7.4 parts of surfactant (Foam-Kill 639) and 95 parts of 2-ethylhexanol. The resultant product was a 65 percent resin solution. This resin solution is identified as the grinding vehicle resin.

The pigment paste was prepared by grinding in a steel ball mill 396 parts of titanium dioxide, 4 parts of carbon black and 143 parts of the grinding vehicle resin above, together with 200 parts of deionized water. The pigment paste was ground to a Hegman No. 7 grind gauge reading.

An electrodeposition bath was prepared by slowly admixing 392 parts of the vehicle resin, 160 parts of the above pigment paste and 3250 parts of deionized water.

Zinc-phosphated steel panels were electrocoated from the above electrodeposition bath at 85°F. at 300 volts for 90 seconds. The resultant electrodeposited film was baked at 350°F. for 25 minutes. The baked film had a thickness of 0.55 mil, was smooth and glossy, although cratered.

The electrodepositable composition had a rupture voltage in excess of 500 volts at 85°F. and had a throw power 500 volts of 5 inches at 66°F., measured in the Ford throw power test.

EXAMPLE II

Into a reactor equipped with stirrer, thermometer, addition means and an inert blanket were charged 500 parts of Epon 836 and this was then heated to 85°C. There was then added over a 2 minute period with stirring a solution comprising 55 parts of thiodiethanol, 48.3 parts of 85 percent lactic acid and 10 parts of water. The reaction mixture was held at 85°C. for 20 minutes and there was then added an additional 10 parts of water and the reaction mixture held between 85°–88°C. for 5 minutes. There was then added an additional 10 parts of water. The above reaction mixture had an epoxy value of 835 and a hydroxyl value of 215.

The above reaction product was diluted to 10 percent solids to form an electrodeposition bath having a pH of 6.4. Aluminum panels were electrocoated at 100 volts for one minute at a bath temperature of 75°F. Steel panels were electrocoated at 200 volts for one minute. The resultant films showed good wet film strength and when baked at 350°F. for 15 minutes showed a film with high gloss and thermoplastic character.

EXAMPLE III

In the manner of Example II, 500 parts of Epon 836 and 50 parts of butyl Cellosolve were charged into a reactor and heated to 82°C. There was then added a solution comprising 55.5 parts of thiodiethanol, 28.2 parts of boric acid and 40 parts of 1,2-propanediol and 10 parts of water over a 2-minute period at 82°C. After 7 minutes, an additional 20 parts of water were added. After an additional 20 minutes at 82°C., an additional 10 parts of water were added. The reaction mixture was heated and the solution became clear at a temperature of 102°C. The reaction mixture had an epoxy value of 644 and a hydroxyl value of 257. The resultant resin was electrodepositable.

EXAMPLE IV

Into a reactor equipped with a stirrer, thermometer, and inert gas blanket were charged 500 parts of Epon 836 and the reactor heated to 95°C. There was then added a solution of 55.5 parts of thiodiethanol, 52.4 parts of 85 percent phosphoric acid and 10 additional parts of water over a 4-minute period at 95°C. After 10 minutes, there was added a mixture of butyl Cellosolve and 10 parts of water, which mixture was added over a period of 50 minutes. There was then added 45 parts of water. A clear resin results at a temperature of 101°C. A 10 percent solids solution of the resin was electrodepositable.

EXAMPLE V

Into a reactor equipped with stirrer, thermometer and addition means were charged 165 parts of Epon 836 and the mixture heated to 56°C. A solution of 22.5 parts of diethyl sulfide, 26.5 parts of 85 percent lactic acid and 5 parts of butyl Cellosolve was added to the reactor and the mixture stirred for 1 hour while raising the temperature to 85°C. There was then added 10 parts of water and after an additional 40 minutes at a reaction temperature of 70°C. an additional 10 parts of water were added. The resultant water-dispersible reaction mixture had a hydroxyl value of 110 and an epoxy value of 5723.

The reaction mixture was reduced to 10 percent solids with water and aluminum and steel panels electrocoated at 100–150 volts for 1 minute to give 0.2 mil film. After baking for 30 minutes at 350°F. the film had good flow, high gloss and thermoplastic character.

EXAMPLE VI

The following example illustrates the preparation of a quaternary and sulfonium salt solubilized acrylic resin containing epoxy groups.

The monomer feed composition was as follows:

| | Percent by Weight |
|---|---|
| Ethyl acrylate | 35 |
| Methyl methacrylate | 30 |
| Glycidyl methacrylate | 15 |
| Hydroxyethyl acrylate | 15 |
| Styrene | 5 |

The above monomer mixture also contained 1.5 percent Vazo (azobisisobutyronitrile) and 3 percent tertiary dodecyl mercaptan.

The polymer was prepared in a reaction flask equipped with thermometer, stirrer, reflux condenser, monomer addition means and a continuous nitrogen gas blanket.

Into the reactor was charged sufficient n-butyl Cellosolve so that the final solids of the resin would be about 80 percent. The contents of the reactor were heated to 90°C. with agitation and under a nitrogen blanket. One-quarter of the total of the monomers, containing initiator and mercaptan, was added over a period of 18 minutes. During this time an exothermic reaction was noted and the temperature increased to about 130°C. After ½ hour, the remaining monomer solution was added over a 4-hour period, maintaining the reaction temperature between 110°C. and 140°C. At the end of this period, the viscous reaction mixture was maintained at 105°C. to 115°C. for an additional hour. Measurement of percent solids in the reaction mixture indicated an essentially complete monomer conversion. There was then added to the reaction mixture 0.1 percent (based on polymer solids) of 2,6-di-tertiary-butylparacresol.

The above reaction mixture was cooled to about 90 C. and there was added one-half the stoichiometric amount necessary to react the total epoxide groups in the polymer an equimolar mixture of bis-2(hydroxyethyl) sulfide and 85 percent lactic acid. The resultant reaction mixture was heated to between 95°C. and 100°C. with agitation for approximately one hour, at which time an aliquot of the reaction mixture, diluted to 10 percent solids in water, gave a transparent bluish-white dispersion. Sufficient water was added to reduce the reaction mixture to 75 percent solids. The resultant polymer had a hydroxyl value of about 200 and an epoxide equivalent of about 2400 (both corrected to 100 percent solids). The resultant reaction product is hereinafter identified as Polymer A.

A second acrylic copolymer was prepared as above, however, the polymer was reacted with a sufficient amount of the equimolar mixture of bis(2-hydroxyethyl)sulfide/lactic acid composition to consume all epoxy groups present in the precursor acrylic resin. The resultant polymer had a hydroxyl value of about 280 and an infinite epoxy equivalent. This reaction product is hereinafter identified as Polymer B.

A pigment paste was prepared by admixing 14.6 parts of Polymer B with 0.57 parts of Aerosol C-61 (An ethanolated alkyl guanadineamine complex). These materials were blended in a Cowles mixer and there was added to the Cowles mixer a mixture of 32.4 parts of deionized water, 0.3 parts of pigmentary silica and 52.5 parts of titanium dioxide. The above paste mixture was then ground in porcelain media to a 6½ Hegman. Twenty-five parts of water per 100 parts of paste was utilized for washout. The resultant pigment paste had a pigment-to-binder ratio of 3.7:1 at 63 percent total solids, contained 49.6 percent pigment and 13.4 percent resin.

An electrodepositable composition was prepared having a pigment-to-binder ratio of about 0.4:1 by admixing the following:
- 80.5 parts of the above pigment paste
- 10.5 parts of 2-ethylhexanol capped toluene diisocyanate
- 10.0 parts of Epon 828
- 92.5 parts of Polymer A
- 2.0 parts of dibutyl tin diacetate After the above materials were throughly blended, 1206 parts of deionized water were slowly added. The resultant paint comprised approximately 10 percent solids and had a conductivity of 360 micromhos.

Zinc phosphated cold-rolled steel panels were electrocoated from the above paint composition as follows:

|  | Percent by Weight |
|---|---|
| Ethyl acrylate | 35 |
| Methyl methacrylate | 30 |
| Glycidyl methacrylate | 15 |
| Hydroxyethyl acrylate | 15 |
| Styrene | 5 |

The monomer mixture contained 1.5 percent Vazo and 3 percent tertiary dodecyl mercaptan. The reaction vessel was charged with sufficient isopropyl alcohol so that the final resin solids were 80 percent. The isopropyl alcohol was heated to 80°C. and one quater of the monomer mixture added. The reaction mixture was maintained at 80°C. for ½ hour. The remaining monomer solution was added over a four-hour period, maintaining the reaction mixture at about 87°C. by reflux of solvent. After the monomer addition was complete, the reaction mixture was refluxed for an additional 3½ hours, at which time analysis indicated a substantially complete conversion of the monomer and 0.1 percent of 2,6-di-tertiary-butyl-paracresol was added.

There was then added to the reaction mixture one-half of the stoichiometric amount necessary to react the tota epoxy groups in the above polymer of an equimolar mixture of bis(2-hydroxyethyl)sulfide and 85 percent lactic acid. The resultant solution was then heated to 86°C. for about 2½ hours, at which time a sample of the reaction mixture diluted to 10 percent solids in water gave a transparent bluish-white dispersion. The polymer had a hydroxyl value of approximately 210 and an epoxy equivalent of about 2600 (both corrected to 100 percent solids). This resin is hereinafter identified as Resin C.

As electrodepositable composition was prepared having a pigment-binder ratio of 0.4:1 by admixing the following:
- 78.7 parts of the pigment paste as in Example I, but with a pigment-to-binder ratio of 4:1

| Applied Voltage (Volts) | Coating Time (Seconds) | Bake Schedule | Film Thickness (Mils) | Pencil Hardness | Salt Spray Resistance[a] |
|---|---|---|---|---|---|
| 150 | 120 | 20 min., 350°F. | 0.9–1.0 | 2H | >264 hrs.[b] |
| 200 | 90 | 20 min., 350°F. | 0.9–1.0 | 2–3H | >264 hrs. |
| 150 | 120 | 20 min., 350°F. | 0.9 | 2–3H | >264 hrs. |
| 150 | 90 | 20 min., 350°F. | 1.2–1.3 | 2H | >264 hrs. |
| 150 | 90 | 20 min., 350°F. | 1.4 | H–2H | >264 hrs. |
| 150 | 60 | 20 min., 350°F. | 0.7–0.8 | 2H | >264 hrs. |
| 150 | 60 | 20 min., 350°F. | 0.9–1.0 | 2H | >264 hrs. |

[a]Standard salt spray test with "X" scribe mark; all panels washed and either scraped with a knife or taped and pulled to test scribe creepage.
[b]3/32 inch scribe screepage or less after scraping or taping.

All panels showed no change upon exposure to strong ultraviolet (Fadeometer) for >675 hours. The yellow index for most panels was between −1 and +2 and was not changed during Fadeometer testing.

EXAMPLE VII

An acrylic polymer was prepared as in Example VI under a nitrogen blanket having the following monomer feed composition:

- 19.0 parts of 2-ethylhexanol capped toluene diisocyanate
- 95.7 parts of Resin C above
- 2.2 parts of dibutyl tin diacetate
- ~ 5.0 parts of 2-ethylhexanol After the above materials were thoroughly blended, there was slowly added 1208 parts of deionized water to give a 10 percent solids paint with a conductivity of about 315 umhos.

Zinc phosphated cold-rolled steel panels were electrocoated from the above paint as follows:

| Applied Voltage (Volts) | Coating Time (Seconds) | Bake Schedule | Film Thickness (Mils) | Pencil Hardness | Salt Spray Resistance[a] |
|---|---|---|---|---|---|
| 150 | 120 | 20 min., 350°F. | 0.8–0.9 | 2H–3H |  |
| 175 | 120 | 20 min., 350°F. | 1.0 | 2H–3H | 264 hrs. |
| 200 | 90 | 20 min., 350°F. | 1.0 | 2H–3H | 264 hrs. |

| Applied Voltage (Volts) | Coating Time (Seconds) | Bake Schedule | Film Thickness (Mils) | Pencil Hardness | Salt Spray Resistance[a] |
|---|---|---|---|---|---|
| 200 | 105 | 20 min., 350°F. | 1.0 | 2H-3H | 264 hrs. |

[a]Standard salt spray test with "X" scribe mark; all panels washed and either scraped with a knife or taped and pulled to test scribe creepage.
[b]¼" scribe creepage after scraping or taping.
[c]⅛" scribe creepage after scraping or taping.

These panels exhibited good impact resistance (about 120–160 inch pounds direct, 100–160 inch pounds reverse). Yellow index measurements range from —0.77 to —1.78. Some typical gloss values are: At 60° — 68–73; at 20° — 20–31.

EXAMPLE VIII

An essentially epoxy group free coating system was prepared as follows in a reaction system as described in Example VI.

|  | Percent by Weight |
|---|---|
| Ethyl acrylate | 35.5 |
| Methyl methacrylate | 37.0 |
| Glycidyl methacrylate | 7.5 |
| Hydroxyethyl acrylate | 15.0 |
| Styrene | 5.0 |

The monomer feed mixture contained, in addition, 5 percent Vazo and 3 percent tertiary dodecyl mercaptan. Into the reactor was charged sufficient n-butyl cellosolve so that the final resin solids was about 80 percent. The solvent was heated to about 90°C. and the polymerization procedure was essentially the same as in Example I. At the end of the polymerization, 0.1 percent of 2,6-tertiary butyl-para-cresol was added. To the polymer thus formed was added a stoichiometric amount (with respect to epoxy groups in the precursor polymer) of an equimolar amounf ot bis(2-hydroxyethyl)sulfide and lactic acid. After about 2½ hours sufficient water was added to give a resin at about 75 percent solids. The resin had a hydroxyl value of about 220 and an epoxy equivalent of essentially infinity.

An electrodepositable composition having a pigment-binder ratio of 0.4:1 was prepared by admixing the following:
78.7 parts of the pigment paste of Example II
18.3 parts of methyl ethyl ketoxime capped Desmodur N-100 (aliphatic triisocyanate)
100.0 parts of the vehicle resin prepared above
1200.0 parts of deionized water Zinc phosphated, cold-rolled steel panels were electrocoated from the above composition as follows:

| Applied Voltage (Volts) | Coating Time (Seconds) | Bake Schedule | Film Thickness (Mils) | Pencil Hardness |
|---|---|---|---|---|
| 150 | 120 | 20 min., 350°F. | 1.2 | 2H |
| 150 | 120 | 20 min., 350°F. | 1.5–1.6 | H–2H |
| 200 | 90 | 20 min., 350°F. | 1.4–1.5 | H–2H |
| 200 | 90 | 20 min., 350°F. | 1.5 | H |

EXAMPLE IX

An epoxy free sulfonium group-containing system was prepared in the manner of Example VII, using isopropanol as the solvent, utilizing a stoichiometric equivalent, based on epoxy groups, of the sulfide/lactic acid mixture. The final material was adjusted to about 70 percent solids by the addition of water and had an infinite epoxy equivalent and a hydroxyl value of about 170 an electrodepositable composition having a pigment-binder ratio of 0.4:1 was prepared by admixing the following:
78.7 parts of the pigment paste of Example II
15.8 parts of 2-ethylhexanol capped toluene diisocyanate
104.2 parts of the vehicle resin of this Example
2.0 parts of dibutyl tin diacetate
1200.0 parts of deionized water Zinc phosphated cold-rolled steel panels were electrocoated from the above electrodepositable paint composition as follows:

| Applied Voltage (Volts) | Coating Time (Seconds) | Bake Schedule | Film Thickness (Mils) | Pencil Hardness |
|---|---|---|---|---|
| 200 | 120 | 20 min., 350°F. | 0.65–0.75 | 2H–3H |
| 225 | 150 | 20 min., 350°F. | 0.7–0.85 | 2H |
| 200 | 90 | 20 min., 350°F. | 0.75–0.85 | 2H–3H |
| 200 | 90 | 20 min., 350°F. | 0.75–0.85 | 2H–3H |

EXAMPLE X

Into a reactor equipped with stirrer, condensor, thermometer, inert gas blanket and heating means were charged 1824 parts of Epon. 829 and 589 parts of Bisphenol A. The mixture was heated to 150°C., at which time an exotherm was noted. The reaction mixture was held at 160° to 176°C. for 45 minutes, after which time 223 parts of 2-ethylhexanol and 13 parts of Foamkill 639 were added. The reaction mixture was cooled to 102°C., at which time were added 280 parts of dimethylethanolamine lactate [prepared by reacting 13 parts of dimethylethanol amine and 18 parts of lactic acid (85 percent aqueous solution) at 40° to 60°C. for a short time, followed by the addition of 7 parts of isopropanol; the product consisted of 75 percent solids] and 161 parts of a 4.5 percent aqueous boric acid solution. The reaction mixture was held at 91°C. for 45 minutes. The mixture was then heated to 98°C. with the addition of 580 parts of methyl ethyl ketone and allowed to cool. A clear resin solution (hereinafter RESIN A) resulted which was analyzed to consist of 70 percent solids, with an epoxy equivalent of 2750 and a hydroxyl value of 162. A second reactor equipped as noted above was charged with 1824 parts of Epon. 829 and 589 parts of Bisphenol A. Th mixture was heated to 150°C. at which time an exotherm was noted. The reaction mixture was held at 162°–165°C. for 45 minutes, after which time 225 parts of 2-ethylhexanol and 13 parts of Foamkill 639 were added. The mixture was allowed to cool to 100°C. and there were then added 139 parts of thiodiethanol, 137 parts of an 85 percent aqueous lactic acid solution and 157 parts of a 4.5 percent aqueous boric acid solution. At 90°C., 631 parts of methyl ethyl ketone were added. The reaction was then heated to 94°C. at which time a clear resin solution was noted. The resin solution (hereinafter RESIN B) consisted of 70.7 percent solids and had an epoxy equivalent of 1600 and a hydroxyl value of 149.

A pigment paste was then prepared by grinding in a steel ball mill 360 parts of titanium dioxide, 40 parts of silicon dioxide, four parts of Tween 40 (Atlas Chemical Co.) and 157 parts of deionized water. The paste was ground to a Hegman No. 7 gauge reading.

Two electrodeposition baths were then prepared by mixing the components set forth in the following table (all parts being parts by weight):

|                      | Bath A          | Bath B          |
|----------------------|-----------------|-----------------|
| Vehicle Resin        | 190.0 (Resin A) | 190.0 (Resin B) |
| Pigment Paste        | 82.0            | 82.0            |
| Butyl Benzyl Phthalate | 13.1          | 13.0            |
| Deionized Water      | 1620.0          | 1620.0          |

Zinc phosphated cold-rolled steel panels were electrocoated from Bath A at 300 volts for 90 seconds with a bath temperature of 80°F. (film build 1.2–1.3 mils). Zinc phosphated cold-rolled steel panels were electrocoated for Bath B at 250 volts for 90 seconds with a bath temperature of 80°F. (film build 1.5 mils). The coated panels were then baked at 350°F. for 20 minutes and 350°F. for 40 minutes. The yellowness index of each panel was then measured (ASTM Designation; D1925-63T) with the results obtained as set forth in the following table:

| Bake Schedule | Bath | Yellowness Index |
|---------------|------|------------------|
| 350°F./20'    | A    | +4.24            |
|               | B    | −0.34            |
| 350°F./40'    | A    | +10.37           |
|               | B    | − 1.82           |

As can be readily seen from the above table, the compositions of the instant invention have significantly less tendencies to yellow upon baking than quaternary ammonium group containing resins.

In a manner similar to the above examples, various other epoxy compounds, sulfides, acids, salts and boron compounds as described hereinabove may be used to provide either epoxy group-containing or essentially epoxy group-free sulfonium salt group-solubilized resins which may be electrodeposited or coated in a conventional manner to provide highly useful coating compositions.

According to the provisions of the Patent Statutes, there are described above the invention and what are now considered its best embodiments; however, within the scope of the appended claims, it is to be understood that the invention can be practiced otherwise than as specifically described.

We claim:

1. In a method of coating a conductive substrate serving as a cathode, which method comprises passing electric current between an anode and said cathode in electrical contact with a water-dispersed composition, the improvement wherein the water-dispersed composition is a water-dispersible, quaternary sulfonium salt-containing resin comprising the reaction product of:
   A. an epoxy group-containing organic material, and
   B. a sulfide-acid mixture, said sulfide acid mixture reacted with said organic material in an amount and at a temperature sufficient to provide a quaternary sulfinium salt-containing, water-dispersible resin.

2. The method of claim 1 wherein said reaction product contains epoxy groups.

3. The method of claim 1 wherein said reaction product contains in the resin molecule at least about 0.1 percent by weight of chemically-bound sulfur in the form of a quaternary sulfonium base salt.

4. The method of claim 3 wherein said quaternary sulfonium base salt is the salt of an acid having a dissociation constant greater than about $1 \times 10^{-5}$.

5. The method of claim 1 wherein said organic material is a polyglycidyl ether of a polyphenol.

6. The method of claim 1 wherein said organic material is a polymer formed from interpolymerizing an olefinically unsaturated epoxy group-containing monomer and at least one other copolymerizable olefinically unsaturated monomer.

7. The method of claim 1 wherein the aqueous dispersion further contains boric acid.

8. The method of claim 1 wherein said quaternary sulfonium salt-containing resin contains oxyalkylene groups.

9. The method of claim 1 wherein said salt is the salt of an organic acid.

* * * * *